United States Patent
Jarabek et al.

(10) Patent No.: US 7,359,379 B2
(45) Date of Patent: Apr. 15, 2008

(54) MANAGING DATA IN A SUBTENDED SWITCH

(75) Inventors: Andrew Jarabek, Nepean (CA); Aris Tombul, Ottawa (CA); Mark Carson, Belfast (GB); Ho Nguyen, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 912 days.

(21) Appl. No.: 10/675,799

(22) Filed: Sep. 30, 2003

(65) Prior Publication Data

US 2006/0233165 A1    Oct. 19, 2006

(51) Int. Cl.
*H04L 12/56* (2006.01)
(52) U.S. Cl. .................. 370/389; 370/388; 370/516; 370/517; 370/545; 370/503
(58) Field of Classification Search .......... 370/386, 370/387, 388, 369, 372, 375, 380, 516, 517, 370/545
See application file for complete search history.

(56) References Cited

U.S. PATENT DOCUMENTS

| | | | |
|---|---|---|---|
| 6,600,742 B1 * | 7/2003 | Hiromori et al. ........... 370/376 |
| 7,013,348 B1 * | 3/2006 | Carson et al. .............. 709/238 |
| 7,016,344 B1 * | 3/2006 | Martin ....................... 370/359 |
| 2002/0080830 A1 * | 6/2002 | Carson et al. .............. 370/542 |
| 2002/0186719 A1 * | 12/2002 | Subrahmanyan et al. ... 370/506 |
| 2003/0202542 A1 * | 10/2003 | Page et al. .................. 370/508 |
| 2004/0260858 A1 * | 12/2004 | Primrose .................... 710/316 |

* cited by examiner

*Primary Examiner*—Edan Orgad
*Assistant Examiner*—Wutchung Chu
(74) *Attorney, Agent, or Firm*—Borden Ladner Gervais LLP

(57) ABSTRACT

A technique for provisioning cross-connects in network switching environment includes receiving a portion of the an input data stream including having header data and the payload data, the payload data occurring at a first offset relative to the header data and generating a delayed version of the portion of the input data stream. The technique also includes generating a portion of a retimed data stream by selecting between the portion of the input data stream and the delayed version of the portion of the input data stream, the retimed data stream including the header data and the payload data, the payload data occurring at a second offset relative to the header data.

18 Claims, 7 Drawing Sheets

MANAGING DATA IN A SUBTENDED SWITCH

BACKGROUND

Synchronous data communications networks can carry payload data within a data stream using any one of a variety of physical layer communication protocols (e.g., using the Synchronous Digital Hierarchy (SDH), or Synchronous Optical Network (SONET) protocol). SONET and SDH use time-division multiplexing (TDM) to combine multiple "low-order" data blocks (such as a Tributary Unit (TU) in SDH, or a Virtual Tributary (VT) in SONET) into a "high-order" data block called a "frame" (e.g., an STS frame). The low-order blocks may be further sub-divided into segments of data associated with different channels.

It is sometimes useful to switch payload data from one channel to another channel using a cross-connect system. Channels can be switched in aggregate blocks. For example, a block of data in a location within a data stream corresponding to one VT time slot can be switched to a location within the data stream corresponding to another VT time slot. A cross-connect system that is capable of switching low-order blocks within high-order frames of a data stream can be built using a random access memory (RAM). An associated processor controls writing of an incoming data stream into the RAM and subsequent reading of an outgoing data stream from the RAM to provide cross-connection. The processor control logic and RAMs used to perform the switching are typically constructed in an integrated circuit.

SUMMARY

In general, in one aspect, the invention features a method including receiving a portion of an input data stream having header data and payload data, the payload data occurring at a first offset relative to the header data, generating a delayed version of the portion of the input data stream, and generating a portion of a retimed data stream by selecting between the portion of the input data stream and the delayed version of the portion of the input data stream. The retimed data stream includes the header data and the payload data. The payload data occurs at a second offset relative to the header data.

Embodiments of the invention may include one or more of the following features.

The header data includes a high-order pointer indicating a byte location of path overhead, and the payload data includes the path overhead.

The method includes modifying the high-order pointer to indicate the second offset.

The method includes modifying the location of the path overhead and associated data within the high-order frame based on the second offset.

The selecting is based on byte locations of the header data within the portion of the input data stream.

The selecting includes switching between the portion of the input data stream and the delayed version of the portion of the input data stream, the switching occurring at boundaries between the header data and the payload data in the portion of the input data stream.

Generating the delayed version includes storing a number of bytes of the portion of the input data stream in a memory device.

The number of bytes is based on a number of adjacent bytes of the header data within the portion of the input data stream.

The number of bytes is further based on a number of bytes for fine-tuning the portion of the input data stream.

The method includes switching the payload data based on a position of the payload data within the portion of the retimed data stream.

The switching includes directing the payload data to one of a plurality of output communication lines.

In general, in another aspect, the invention features an apparatus including a high-order switch, a low-order switch subtended from the high-order switch, and a variable delay element between the high-order switch and the low-order switch. The variable delay element is configured to receive a portion of an input data stream having header data and payload data, the payload data occurring at a first offset relative to the header data, generate a delayed version of the portion of the input data stream, and generate a portion of a retimed data stream by selecting between the portion of the input data stream and the delayed version of the portion of the input data stream. The retimed data stream includes the header data and the payload data. The payload data occurs at a second offset relative to the header data.

In general, in another aspect, the invention features a computer program product tangibly embodied on a computer readable medium, for provisioning cross-connects in network switching environment comprising instructions for causing a computer to receive a portion of an input data stream having header data and payload data, the payload data occurring at a first offset relative to the header data, generate a delayed version of the portion of the input data stream, and generate a portion of a retimed data stream by selecting between the portion of the input data stream and the delayed version of the portion of the input data stream. The retimed data stream includes the header data and the payload data. The payload data occurs at a second offset relative to the header data.

Other features and advantages of the invention will become apparent from the following description, and from the claims.

DESCRIPTION

Figure 1:
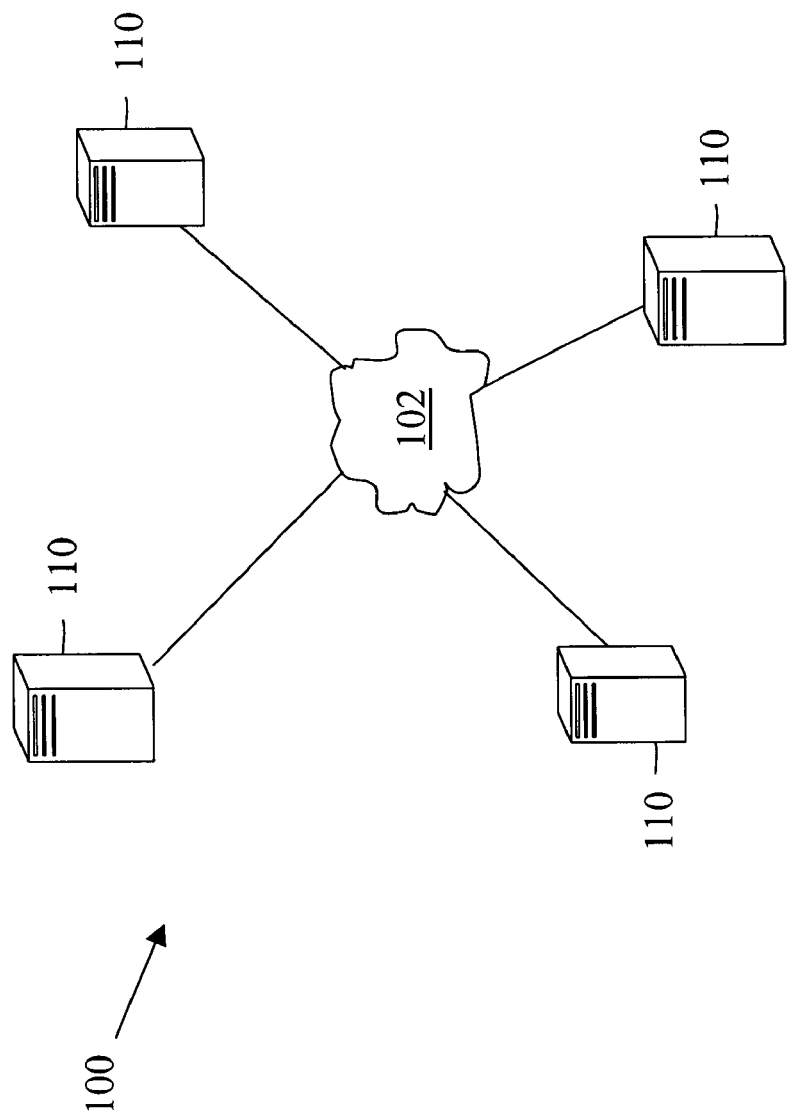
FIG. 1 is a block diagram depicting a synchronous communication system.

Referring to FIG. 1, a synchronous communication system 100 includes network elements 110 in communication with one another via a network infrastructure 102. The network infrastructure 102 may include other network elements or nodes, and/or sub-networks, arranged in configurations such as a ring configuration, a hub configuration, a point-to-point configuration, and so forth. The network elements may include synchronous transmission devices such as a multiplexer, a regenerator or a cross-connect. The network 100 transmits data using a physical layer communication protocol such as SONET or SDH.

Some of the network elements 110 in the network 100 perform switching of data channels using a cross-connect system (not shown). Switching can be performed on high-order data structures (e.g., on data segments with a granularity of STS frame) and/or on low-order data structures (e.g., on data segments with a granularity of a VT or TU). (Though SONET STS and VT are discussed throughout, the techniques apply to SDH where other high-order mappings such as VC-4 and VC-3 apply and TU-11 and TU-12 are the low-order signals.) For example, a "partial VT switching" technique involves switching a portion of a data stream at an STS frame level and another portion of the data stream at a VT group level. One way to provide "partial VT switching" is by using a VT switching device "subtended" from an STS switching device.

When a low-order switch (such as a VT switch) is "subtended" from a high-order switch (such as an STS switch) the high-order switch passes to the low-order switch only portions of an incoming data stream comprising low-order data to be switched (where switching normally takes the form of timeslot interchanging and/or port interchanging) all other data in the incoming data stream is handled by the high-order switch alone.

Figure 2:
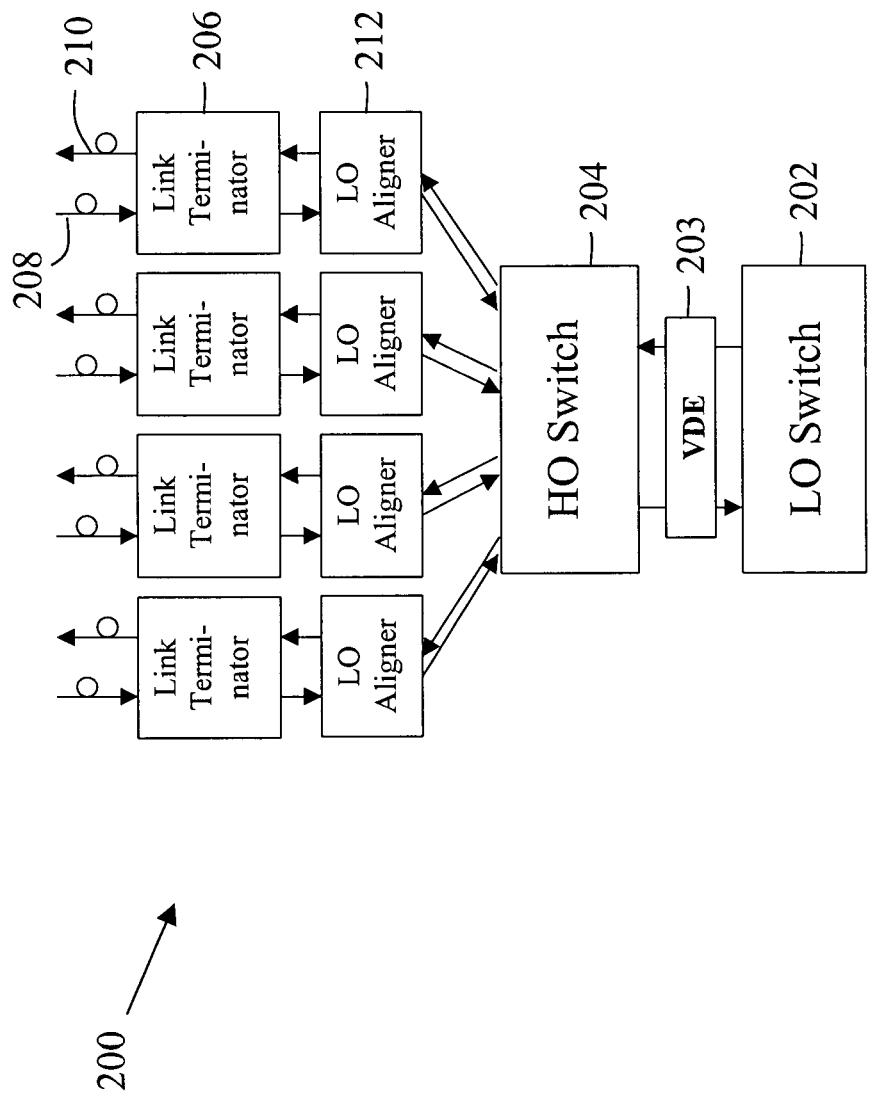
FIG. 2 is a block diagram depicting a cross-connect system.

Referring to FIG. 2, a cross-connect system 200 includes a low-order switch 202 (e.g., a VT switch), subtended from a high-order switch 204 (e.g., an STS switch). The cross-connect system 200 also includes a link terminator 206 for respective pairs of input 208 and output 210 communication lines (e.g., optical fibers). The link terminator 206 receives incoming data streams from the input communication line 208, and sends switched outgoing data streams onto the output communication line 210 or to an end user or other network element (not shown).

The link terminator 206 is connected to a low-order aligner 212 that aligns an incoming data stream to a local timing reference and aligns an incoming data frame to a reference data frame structure determined by the local timing reference. The low-order aligner also performs low-order pointer processing operations as defined in applicable standards such as the International Telecommunications Union Telecommunications Standardization Sector (ITU-T) standard G707 and Telcordia standard GR253.

When an incoming data stream is received by a switch, a portion of the incoming data stream is written into a memory device, stored for a period of time, and read from the memory device and sent as an outgoing data stream from the switch with an associated time delay. Alternatively, more than one memory device may be used. For example, a switch writes received data into a first memory device, and reads data from a second memory device. After data has been written to the allocated memory locations in the first memory device, and data locations in the second memory device have been read, the respective functions of the memory devices are reversed so that the next portion of the incoming data stream is written to the second memory while the data stored in the first memory is read as output.

A switch introduces delay between a data frame structure being received at an input of a switch and a data frame structure being delivered on an output of the switch. Factors that contribute to the delay can include storage time, transit delays through the switch, and processing delays and so forth.

If all of the frames in an incoming data stream pass through both the high-order switch 204 and the low-order switch 202, then the frames will all experience the same associated switching delay. However, if only a portion of the frames pass through the low-order switch 202 for low-order switching, then a data frame provided to the high-order switch 204 from the low-order switch 202 may be misaligned with respect to other data frames being switched in the high-order switch 204.

A variable delay element (VDE) 203 is included between an output of the high-order switch and an input of the low-order switch, or between an output of the low-order switch and an input of the high-order switch, or both. The VDE 203 generates a retimed data stream to correct potential frame misalignment.

Figure 3:
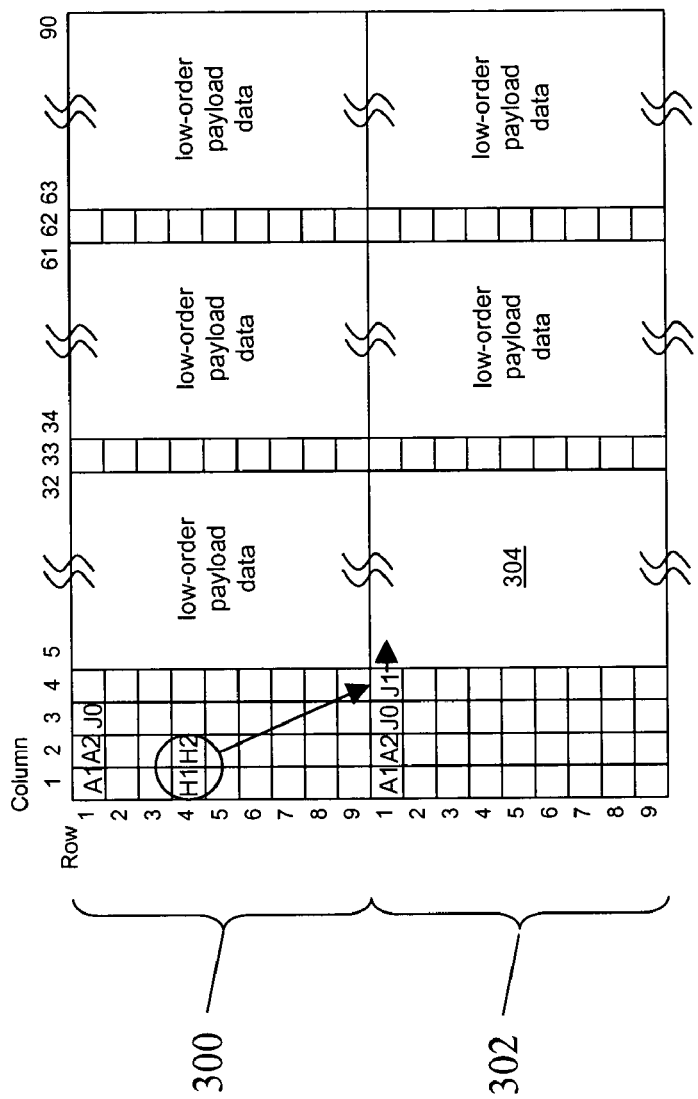
FIG. 3 is a representation of high-order data frames.

Referring to FIG. 3, a representation of a high-order data frame 300, such as a SONET STS-1 frame, includes nine sequential segments of data illustrated here as nine rows of data stacked in columns. The nine rows of the next high-order data frame 302 are also shown. A first byte A1 identifies the beginning of each frame. The first three columns (numbered 1-3) represent the first three bytes of each data segment. These first three bytes of each row are overhead information for the respective frame. A high order pointer H1/H2, formed from the first two bytes of row 4, locates path overhead J1 that precedes low-order payload data 304. The three columns of overhead information occur in a predetermined position in time with respect to the local timing reference for a cross-connect system processing the frame 300.

One way to correct the potential frame misalignment in a subtended switch is by moving the position of the overhead information bytes within the data stream such that the overhead information bytes maintain a predetermined position in time with respect to the local timing reference. Correcting the frame in this way may involve correcting pointer values by moving the position of the path overhead J1 and associated payload area 304, adjusting the value of the high-order pointer H1/H2 to reflect the new position of the path overhead J1 and payload area 304.

The pointers are adjusted in the low order aligner 212 and the resulting adjusted frames passed down to the subtended low-order switch 202 and realigned in time to the frames that were not passed to the low-order switch 202 based on the adjusted pointers.

Alternatively, unadjusted frames can be passed down to the subtended low-order switch 202 and realigned in time to the frames that were not passed to the low-order switch 202 with pointer adjustments performed in the VDE 203.

In either case, adjustment of the overhead information bytes (and the corresponding change of the relative location of payload data within a frame) can be efficiently achieved in a subtended cross-connect system using a Variable Delay Element (VDE). The VDE can be used at the input of the low-order switch 202 to realign adjusted frames, or the VDE can be used at the output of the low-order switch 202 to realign unadjusted frames.

Figure 4A:
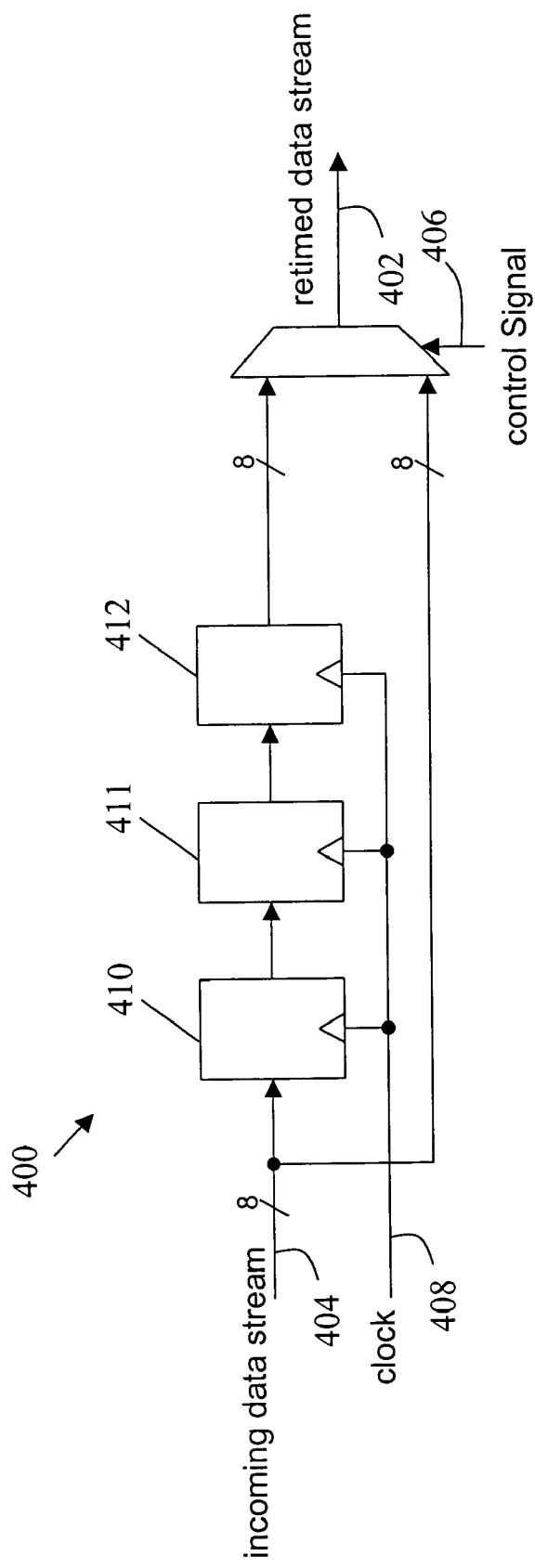
FIG. 4A is an example of a variable delay element.

Referring to FIG. 4A, an example of a Variable Delay Element 400 for an STS-1 frame structure is shown that produces a retimed data stream 402 from an incoming data stream 404 based on a control signal 406 that selects a delayed or non-delayed version of the incoming data stream 404. A clock 408 controls three registers 410-412. Each register delays the incoming data stream by one clock cycle, providing a total of three clock cycles of delay through the registers. Each cycle of delay corresponds to a delay of one byte of a high-order frame in the representation of FIG. 3. So the Variable Delay Element (VDE) in FIG. 4A can skip three bytes in a data stream (if the control signal switches from the delayed version to the non-delayed version), or repeat three bytes in a data stream (if the control signal switches from the non-delayed version to the delayed version). If three bytes are repeated, those byte positions can be overwritten with new data, which is useful for inserting new overhead bytes at an arbitrary position in a data stream. Overhead bytes in the incoming data can also be removed by skipping the three byte positions corresponding to the overhead bytes. The width of the data lines, 8 bits (1 byte), corresponds to the width of the incoming data stream 404.

Figure 4B:
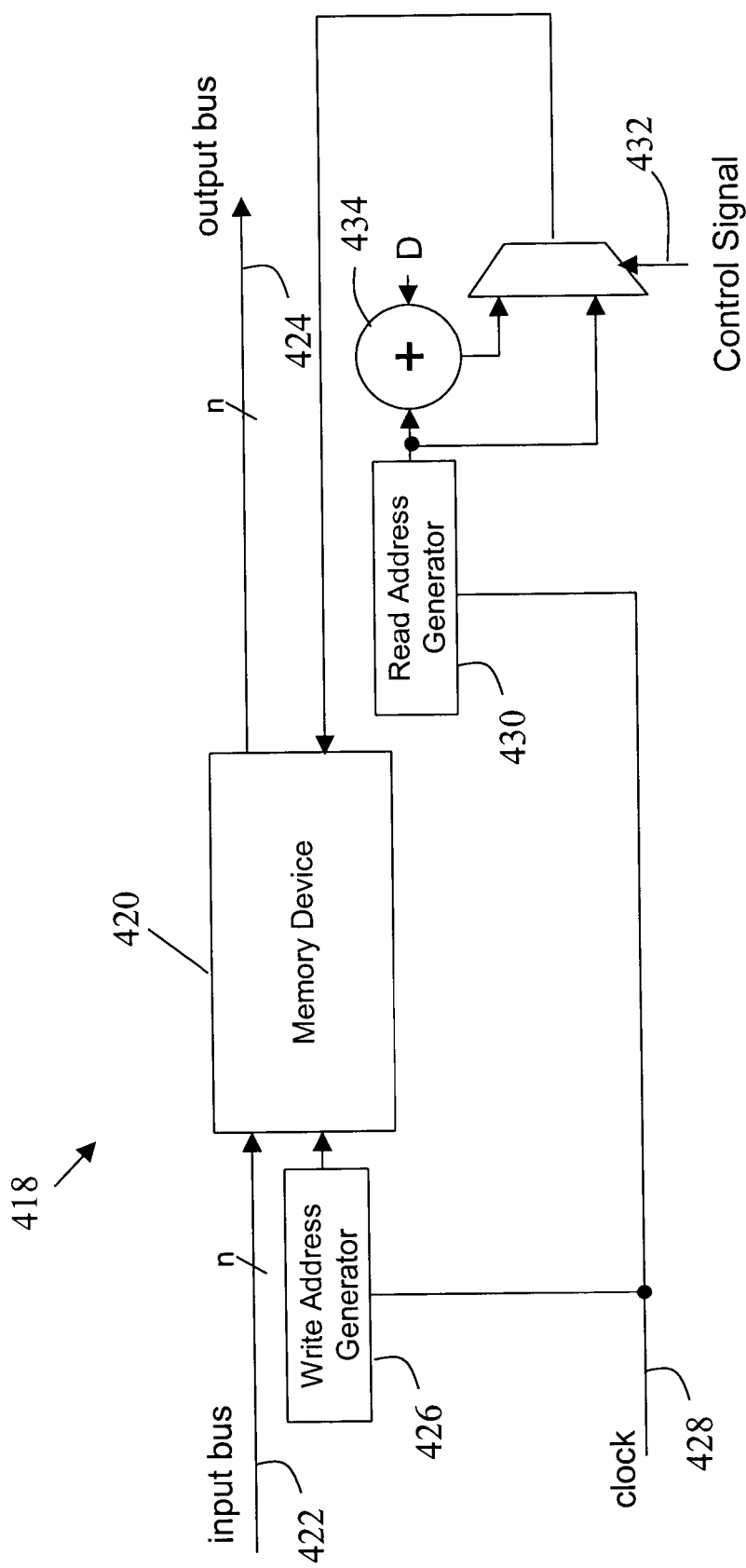
FIG. 4B is another example of a variable delay element.

Referring to FIG. 4B, another example of a Variable Delay Element (VDE) 418 includes a memory device 420 (e.g., a RAM) with a write port receiving data from an incoming data stream over an input bus 422 and a read port outputting a retimed data stream over an output bus 424. A write address generator 426 determines an address at which to write incoming data into the memory device 420. The write address generator 426 increments the address at each cycle of a clock 428 and wraps around to the beginning at the end of a provisioned memory space in the memory device 420.

The amount of memory space provisioned in the memory device is at least D+1 n-bit words deep where D is the desired delay of the VDE 418. The delay provided by the VDE 418 depends on the number of overhead bytes to be inserted or skipped in a high-order frame structure. For STS frames, there are 3 bytes of overhead from each STS-1 frame within the high-order frame structure. So, for an incoming data stream with an STS-48 high-order frame structure D=3×48=144 and n=8.

The VDE 418 uses a read address generator 430 to provide two read addresses, one of which is selected by a control signal 432. The first read address increments each clock cycle trailing the write address by one cycle. The second read address trails the first read address by D cycles using a modulo W adder 434, where W is the number of consecutive addresses in the provisioned memory space. By selecting between these two read addresses, either the data is fetched from the memory with 1 cycle of delay (one cycle after it is written) or with D+1 cycles of delay. Selection of the delayed or non-delayed version of the stream allows D overhead byte locations to be skipped or inserted. For a wide input bus 422 and/or a large delay D, a memory-based VDE will draw less current and occupy less space in an integrated circuit than either register or latched based approaches.

Figure 5A:
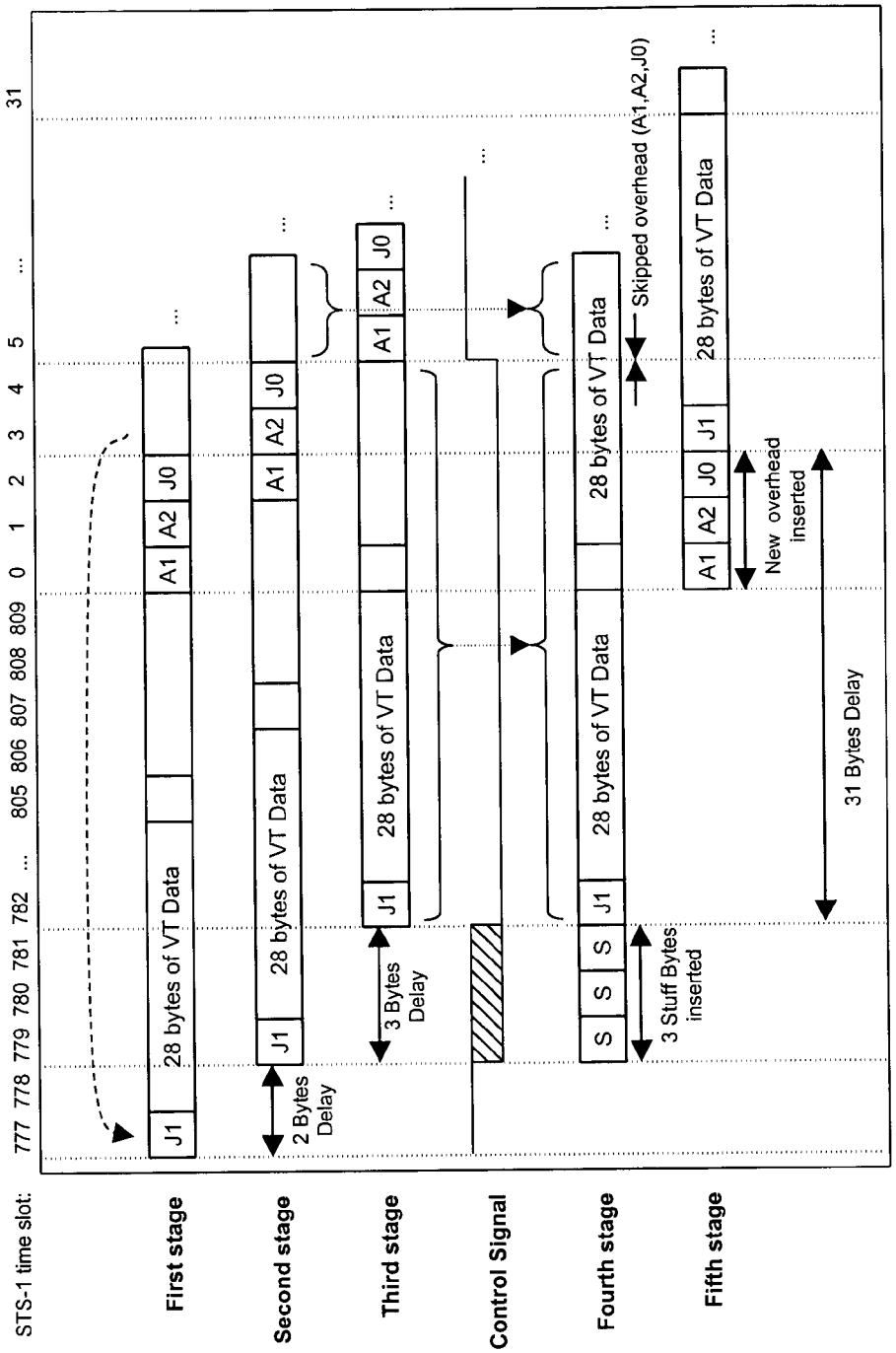
FIG. 5A is a diagram depicting an example of timing at various stages of aligning a frame structure.

Referring to FIG. 5A, an example of timing for aligning bytes of an STS-1 frame structure within a data stream includes a first stage showing a portion of an adjusted frame that is received at a high-order switch. Each frame has nine rows each having 90 bytes for a total frame length of 810 bytes. Time slots for the bytes are numbered from '0' to '809' corresponding to the reference data frame structure determined by the local timing reference. A frame that is aligned with respect to this timing reference has the first byte A1 occurring at time '0'.

The first stage has a path overhead J1 that has been moved to time slot '777' (e.g., by the low order aligner 212) such that after the frame incurs delay through the high-order and low-order switches, the path overhead J1 can be aligned at a time slot of '3'. A second stage shows the portion of the frame applied to the input of the VDE after two bytes of delay incurred passing through the high-order switch. A third stage shows the portion of the frame after three bytes of delay within the VDE. A fourth stage shows the output of the VDE (at the input of the low-order switch) which corresponds to bytes selected from either the delayed or non-delayed stream as determined by the state of the control signal. The fourth stage shows three "stuff byte" locations in time slots '779-781' and shows that the three overhead bytes previously in time slots '2-4' (in the second stage) have been skipped. A fifth stage shows the realigned frame after 31 bytes of delay incurred passing through the low-order switch. It has new overhead bytes written over the stuff bytes so that the start of the realigned frame occurs with an A1 byte at time slot '0'. The overhead bytes may be generated by the low-order switch or sourced from a memory which buffered them from a previous input. The low-order switch typically corrects specific overhead bytes such as H1/H2 in order to satisfy input conditions for downstream devices.

Figure 5B:
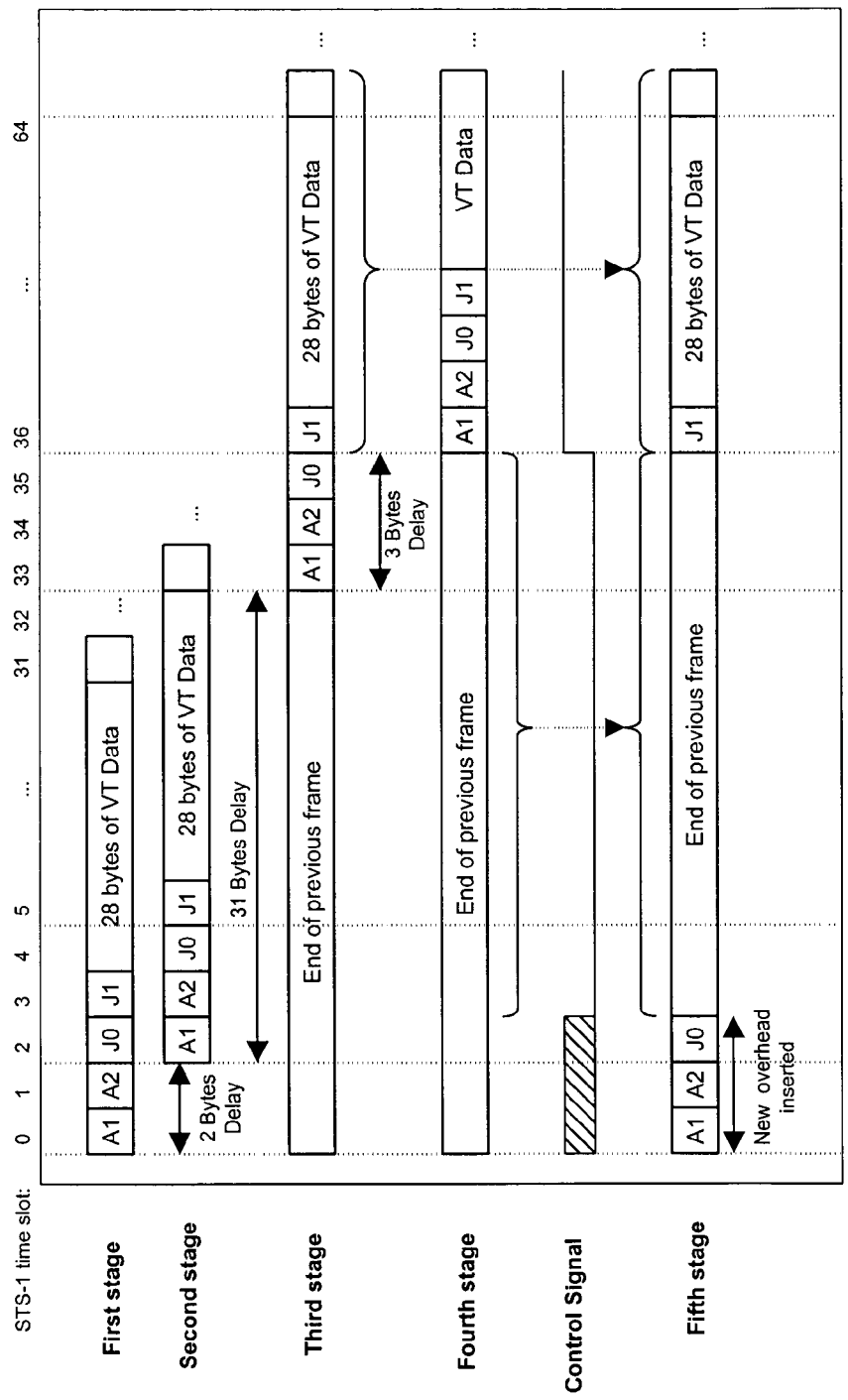
FIG. 5B is a diagram depicting another example of timing at various stages of aligning a frame structure.

Referring to FIG. 5B, another example of timing for aligning bytes of an STS-1 frame structure within a data stream includes a first stage showing a portion of an unadjusted frame that is received at a high-order switch. Here the path overhead J1 occurs at time slot '3'. A second stage shows the portion of the frame applied to the input of the low-order switch after two bytes of delay incurred passing through the high-order switch. A third stage shows the frame after 31 bytes of delay incurred passing through the low-order switch. A fourth stage shows the portion of the frame after three bytes of delay within the VDE. A fifth stage shows the portion of the frame after the VDE has selected bytes from either the delayed or non-delayed stream as determined by the state of the control signal. The VDE has inserted three new overhead bytes in time slots '0-2' so that the start of the realigned frame occurs with an A1 byte at time slot '0'. The high-order pointer (not shown) is adjusted to reflect the new location of the path overhead J1 at time slot '36'.

The example of FIG. 5A uses a VDE at the input of the low-order switch. The example of FIG. 5B uses a VDE at the output of the low-order switch. For additional flexibility a multiplexer circuit can be used so that a VDE can be used at either the input or the output to realign either adjusted or unadjusted frames. A VDE can be included in an ASIC as a stand-alone device or integrated within a cross-connect system (e.g., as part of a high-order switch or a low-order switch).

A VDE may also be used to tune an output frame of a low-order switch in steps finer than one high-order unit (e.g., an STS column). For example, if a high-order switch has 2.5 Gbps serial inputs which tolerate some amount of skew between inputs with respect to a synchronization pulse, it may not be possible to achieve alignment between the first stage inputs to the high-order switch and those emerging from a low-order switch using high-order pointer fixing techniques alone. This is because high-order pointer fixing techniques provide only coarse tuning (for example one column corresponds to 48 bytes in a STS-48 stream).

The memory-based VDE approach shown in FIG. 5B can be used for fine-tuning the delay of a data stream in increments of one clock cycle. This is achieved by increasing the memory depth of memory device 420 from D+1 to D+1+T, where T is the desired fine-tuning space. Setting an offset of T counts between the write address produced by write address generator 426 and the read address generated by read address generator 430 ensures that there is a minimum of 1+T cycles between the VDE input and output stages.

Other embodiments are within the scope of the following claims.

What is claimed is:

1. A method comprising:
receiving a portion of an input data stream having header data and payload data, the payload data occurring at a first offset relative to the header data;
generating a delayed version of the portion of the input data stream; and generating a portion of a retimed data stream by selecting between the portion of the input data stream and the delayed version of the portion of the input data stream, the retimed data stream including the header data and the payload data, the payload data within the refined data stream occurring at a second offset relative to the header data.

2. The method of claim 1 wherein the header data includes a high-order pointer indicating a byte location of path overhead, and the payload data includes the path overhead.

3. The method of claim 2 further comprising modifying the high-order pointer to indicate the second offset.

4. The method of claim 2 further comprising modifying the path overhead based on the second offset.

5. The method of claim 1 wherein the selecting is based on byte locations of the header data within the portion of the input data stream.

6. A method comprising:
receiving a portion of an input data stream having header data and payload data, the payload data occurring at a first offset relative to the header data;
generating a delayed version of the portion of the input data stream; and
generating a portion of a retimed data stream by selecting between the portion of the input data stream and the delayed version of the portion of the input data stream, the retimed data stream including the header data and the payload data, the payload data within the refined data stream occurring at a second offset relative to the header data;
wherein the selecting comprises switching between the portion of the input data stream and the delayed version of the portion of the input data stream, the switching occurring at boundaries between the header data and the payload data in the portion of the input data stream.

7. The method of claim 1 wherein generating the delayed version comprises storing a number of bytes of the portion of the input data stream in a memory device.

8. The method of claim 7 wherein the number of bytes is based on a number of adjacent bytes of the header data within the portion of the input data stream.

9. The method of claim 8 wherein the number of bytes is further based on a number of bytes for fine-tuning the portion of the input data stream.

10. The method of claim 1 further comprising switching the payload data based on a position of the payload data within the portion of the retimed data stream.

11. The method of claim 10 wherein the switching comprises directing the payload data to one of a plurality of output communication lines.

12. An apparatus comprising:
a high-order switch; a low-order switch subtended from the high-order switch; and
a variable delay element between the high-order switch and the low-order switch, configured to
receive a portion of an input data stream having header data and payload data, the payload data occurring at a first offset relative to the header data;
generate a delayed version of the portion of the input data stream; and
generate a portion of a retimed data stream by selecting between the portion of the input data stream and the delayed version of the portion of the input data stream, the retimed data stream including the header data and the payload data, the payload data within the refined data stream occurring at a second offset relative to the header data.

13. The apparatus of claim 12 wherein the variable delay element is located between an output of the high-order switch and an input of the low-order switch.

14. The apparatus of claim 12 wherein the variable delay element is located between an output of the low-order switch and an input of the high-order switch.

15. A computer program product tangibly embodied on a computer readable medium, for provisioning cross-connects in network switching environment comprising instructions for causing a processor to:
receive a portion of the an input data stream including having header data and the payload data, the payload data occurring at a first offset relative to the header data;
generate a delayed version of the portion of the input data stream; and
generate a portion of a retimed data stream by selecting between the portion of the input data stream and the delayed version of the portion of the input data stream, the retimed data stream including the header data and the payload data, the payload data within the refined data stream occurring at a second offset relative to the header data.

16. The method of claim 3 further comprising modifying the high-order pointer to indicate the second offset wherein said second offset is a fixed value.

17. The apparatus of claim 12 wherein variable delay element is further configured to modify the high-order pointer to indicate the second offset wherein said second offset is a fixed value.

18. The computer program product of claim 15 further comprising instructions for causing said processor modifying the high-order pointer to indicate the second offset wherein said second offset is a fixed value.

* * * * *